United States Patent
Swithenbank

Patent Number: 6,105,517
Date of Patent: Aug. 22, 2000

[54] FLY ASH TREATMENT

[75] Inventor: Joshua Swithenbank, Sheffield, United Kingdom

[73] Assignee: University of Sheffield, United Kingdom

[21] Appl. No.: 09/297,003

[22] PCT Filed: Oct. 30, 1997

[86] PCT No.: PCT/GB97/02831

§ 371 Date: Jun. 21, 1999

§ 102(e) Date: Jun. 21, 1999

[87] PCT Pub. No.: WO98/18738

PCT Pub. Date: May 7, 1998

[30] Foreign Application Priority Data

Oct. 30, 1996 [GB] United Kingdom .................... 9622548

[51] Int. Cl.[7] ................................. F23J 3/00; F23J 1/00; F01N 3/10; B01D 50/00
[52] U.S. Cl. ...................... 110/344; 110/165 A; 422/173; 422/175; 422/178
[58] Field of Search ..................... 110/342, 343, 110/165 A, 165 R, 344, 345, 341; 422/205, 194, 146, 173, 175, 178

[56] References Cited

U.S. PATENT DOCUMENTS

| | | |
|---|---|---|
| 2,933,796 | 4/1960 | Somogyi . |
| 4,923,391 | 5/1990 | Gitman ....................................... 431/10 |
| 5,024,817 | 6/1991 | Mattison ................................... 422/111 |
| 5,065,680 | 11/1991 | Cheetham ................................ 110/342 |
| 5,297,495 | 3/1994 | Weber ...................................... 110/346 |
| 5,390,611 | 2/1995 | John .................................... 110/165 A |

FOREIGN PATENT DOCUMENTS

| | | |
|---|---|---|
| 0 034 389 A1 | 8/1981 | European Pat. Off. . |
| 0 566 376 A1 | 10/1993 | European Pat. Off. .......... B09B 3/00 |
| 62256746 | 1/1986 | Japan .............................. C04B 18/08 |
| 62-256746 | 11/1987 | Japan . |
| 63-051965 | 3/1988 | Japan . |
| 03247541 | 11/1991 | Japan . |
| 09159370 | 6/1997 | Japan .............................. F27B 15/00 |
| 942620 | 11/1961 | United Kingdom . |

*Primary Examiner*—Denise L. Ferensic
*Assistant Examiner*—Kenneth B. Rinehart
*Attorney, Agent, or Firm*—Fish & Richardson P.C.

[57] ABSTRACT

A process for treating toxic fly ash from an incinerator which comprises heating the fly ash held in suspension in a combustible or combusted gas at least to a temperature at which sintering of the fly ash takes place.

15 Claims, 1 Drawing Sheet

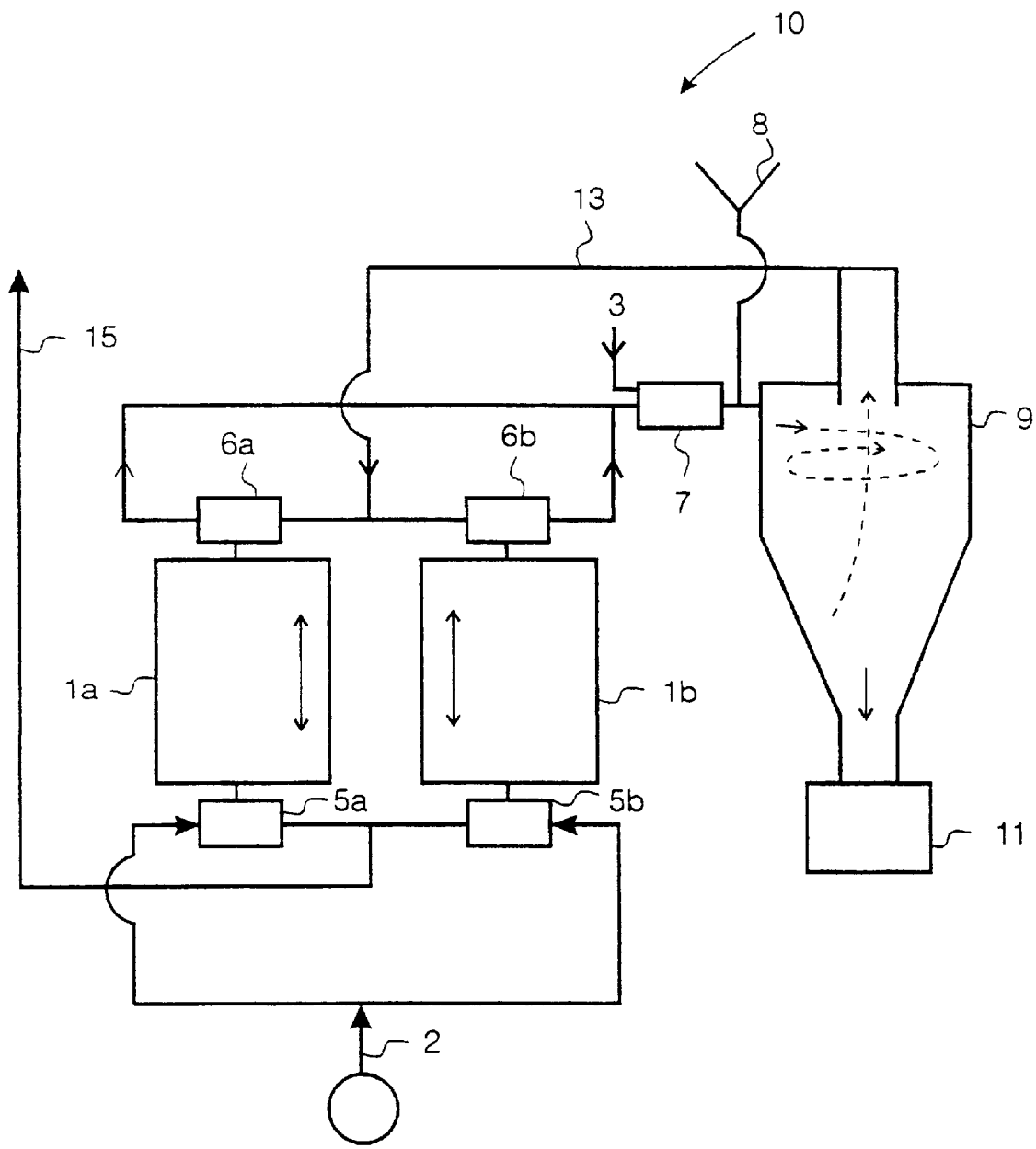

FLY ASH TREATMENT

BACKGROUND

This invention relates to the treatment of fly ash and other ash of a fine particulate nature, and in particular to its detoxification and/or re-use. The invention provides novel apparatus and methods for such treatment.

An object of the present invention is to treat toxic fly ash from incinerators, which ash is particulate, and other ash of particulate nature which can be retrieved, for example, from bottom ash of incinerators, and to convert such ash into a material which can be used, for example, in the construction industry. Throughout this specification, reference is made to fly ash, but this term is to be understood to include ash of fine particulate nature from any source of an incinerator, including bottom ash. In the UK the total toxic fly ash which is produced is approximately 200,000 tonnes/year from municipal incinerators alone. There is a major problem in the disposal of the fly ash/grit from an incinerator since it contains toxic, leachable heavy metals and organic materials such as dioxins. It is becoming more difficult and expensive to find landfill sites in which it is permitted to bury such material.

It has been proposed to heat fly ash to its fusion temperature in an arc furnace to form a fused slag which can be used for road making or for construction material purposes. Such processes, however, require a great deal of energy and are relatively inefficient.

GB-A-942620 discloses pelletising fly ash with a binder and then sintering the fly ash pellets on a moving grate. Nevertheless, this method requires a great deal of energy as well, not just to drive off the water binding the pellets together, but also to heat the inside of the pellets to effect internal sintering of the pellet ash. EP-A-0034389 discloses a similar process, as does JP-A-62256746. JP-A-3247541 appears to suggest settling fly ash on a moving grate and sintering it there.

JP-A-6351965 discloses a cyclone the inside of which is coated with sintered Titanium Dioxide.

SUMMARY

According to the present invention there is provided a process for treating toxic particulate ash from an incinerator which comprises providing a flow of combustible gas, burning the gas, suspending the particulate ash in the moving gas to heat the ash while in suspension to a temperature at which sintering of the fly ash takes place, separating the ash while still at sintering temperature and forming the ash to produce a frit or sintered pellets of ash.

The present invention also provides apparatus for treating toxic particulate ash from incinerators, which comprises means for producing a flow of a combustible gas, means to ignite the gas so that it burns, means to introduce the ash into the gas so that it is suspended in the flow of gas and heated by the gas so that the temperature of the fly ash is raised to at least a temperature at which sintering of the fly ash takes place, means to separate hot ash from the gas, and means to form pellets or frit of sintered ash.

It has been found that, in the process of the present invention, sintering of the fly ash can result in substantial destruction of its toxic organic components and also fixation of its heavy metal content to form a substantially unleachable material which can be used, for example in applications such as building roads and foundations.

In order to sinter the fly ash material, its temperature must be raised to the softening point. This occurs at a temperature of about 850° C., which is significantly lower than its melting point at about 1300° C. A preferred sintering temperature is in the range of from about 750° C. to 1000° C.

For many purposes it will be sufficient to raise the temperature of the fly ash particles to the sintering temperature. The invention does not, however, exclude the possibility that the fly ash particles can be heated to their fusion temperature in order to produce an unleachable slag or frit.

Preferably, the fly ash is caused to reach sintering temperature within a cyclone. The fly ash is introduced into the cyclone simultaneously with the introduction of hot combustible gas, or combusted gas products, and the fly ash particles (which typically have an average particle size of 20–25 $\mu$m and are thus in suspension in the gas) are heated to their sintering temperature in a fraction of a second after the particles enter the cyclone. The particles are preferably separated from the gas in the cyclone and allowed to drop into a pelletising or frit chamber.

The apparatus of the invention preferably comprises a regeneration burner system, and, for example, heat regenerators can be used to ensure high energy efficiency of the sintering or fusion process. Indeed, reuse of the heat of the process of the present invention is fundamental to its economic viability, although the reuse does not necessarily have to be in the present process but could be in another process. More preferably, the regenerators are a pair of pebble beds which are provided with hot valves enabling air preheat to a level of up to, for example, about 1000° C. to be obtained. Examples of heat regenerators are described in UK Patents Nos 2128724, 2170584, 2170585, 2136553, 2179730, 2184823, 2182764, 2192264 and in European Patent Application No 87301985, the entire disclosures of which are incorporated herein by reference for all purposes.

The combustible gas used in the present invention is preferably air, which may be oxygen enriched and/or combined with a liquid or gaseous fuel such as, for example, natural gas. Preferably the combustible gas is pre-heated to a temperature in the range of from 600 to 1000° C.

DESCRIPTION OF DRAWING

An embodiment of the present invention will now be described, by way of example only, with reference to the accompanying Drawing which is a schematic diagram of apparatus of the invention.

DETAILED DESCRIPTION

Referring to the accompanying Drawing, apparatus 10 in accordance with the present invention includes a pair of pebble beds 1a,b, each of which is provided with two hot valves 5a,b. The pebble beds provide air preheat for air which is to be delivered to a burner 7 via valves 6a,b of the beds 1a,b. Thus air enters the first bed 1a, for example, through valve 5a which is open at this time to line 2 from an air source (not shown). Valve 6a is open to the burner 7 so that air heated in the bed 1a passes to the burner. Fuel is added to the preheated air at 3 to raise its temperature a few hundred degrees before combustion in the burner 7. Fly ash from the incinerator plant ESP/bag filter (not shown) or elsewhere, is added at 8 to the flow of hot gases emanating from the burner 7 and the particles of ash are held in suspension as the flow is introduced into a cyclone 9.

The particles are heated almost instantaneously on their introduction to the gas flow at 8 to their sintering temperature, and they are separated from the gas in the cyclone and pass into a pelletising chamber 11 where sintering with other particles largely takes place (some sintering of course occurs in the cyclone chamber) and pellets of ash sintered throughout each pellet are produced.

The gas in the cyclone 9 is returned on line 13 to the second pebble bed 1b through valve 6b which is thus open to line 13 but closed to the burner 7. The heat content of the gas is therefore recovered in the bed 1b which accordingly heats up. Cooled gas exits bed 1b through valve 5b which is open to line 15 directing the gas to, for example, the incinerator plant upstream of its ESP/bag filter (not shown). The cycle of flow through the beds 1a,b is reversed periodically by switching the four valves 5,6a,b, perhaps every two minutes.

As an alternative to sintering, ash fusion or melting can be used and, as previously mentioned, such a process is within the scope of the present invention. Apparatus similar to that described above can raise the temperature of the particles to their fusion/slagging point at about 1300° C. or above. In this case, the product is an unleachable frit produced, for example, by running the slag into a water quench.

The optimum operating temperature will depend on the gas temperature and the ash fusion point. Melting of the particles may cause them to stick to the walls and result in a build-up. However, in this case the temperature can be increased to the point where the slag runs readily down the walls of the cyclone. The walls may be cooled to form a solid slag layer under the fluid layer in order to protect the walls from erosion.

The particle heat-up time may be calculated from the conventional relationship:

$$m_p c_p \frac{dT_p}{dt} = hA(T_\infty - T_p)$$

where the heat transfer coefficient h is evaluated from:

$$Nu = \frac{hD_p}{k_\infty} = 2.0 + 0.6\, Re_d^{1/2} Pr^{1/3}$$

where $m_p$ is the mass of a particle, $T_p$ is the temperature of the particle, $c_p$ is the heat capacity of a particle, $T_\infty$ is the temperature of the gas, $D_p$ is the diameter of the particle, Pr is the Prandtl Number and $Re_d$ is the Reynolds Number based on the particle diameter.

The ash particle heat up time is matched to the residence time of the particles in the hot environment. In an alternative embodiment, the ash may be introduced into the hot gas flow a significant distance upstream of the cyclone chamber. In a further alternative embodiment the cyclone chamber may be provided with two separate inlets which carry swirling flow and axial flow respectively.

Among many other alternative embodiments, an apparatus in accordance with the present invention may be in the form of a hot valve-less system comprising two or more cyclones. Apparatus of the invention may also, instead of, or in addition to a cyclone, comprise a ceramic bag filter or a settling chamber or other appropriate separation device.

What is claimed is:

1. A process for treating toxic particulate ash from an incinerator which comprises:

providing a flow of combustible gas, burning the gas, suspending the particulate ash in the moving gas to heat the ash while in suspension to a temperature at which sintering of the fly ash takes place, separating the ash while still at sintering temperature, and transforming the ash to produce a frit or to produce sintered pellets of ash;

wherein the gas is heated in a regeneration burner system.

2. A process as claimed in claim 1, in which the ash is introduced into the gas before combustion thereof.

3. A process according to claim 1, in which the sintering temperature is in the range of from 750° C. to 1000° C.

4. A process according to claim 1, in which at least some of the ash particles, are heated to their fusion temperature.

5. A process according to claim 1, in which the ash is caused to reach at least its sintering temperature within a cyclone.

6. A process according to claim 5, in which the particles are separated from the gas in the cyclone and allowed to drop into a pelletising chamber or a frit chamber.

7. A process according to claim 1, in which the combustible gas is preheated to a temperature in the range of from 600° C. to 1000° C.

8. A process according to claim 5, in which the walls of the cyclone are cooled to form a solid slag layer on the walls in order to protect them from erosion.

9. An apparatus for treating toxic particulate ash from incinerators, which comprises:

means for producing a flow of a combustible gas, means for igniting the gas so that it burns, means for introducing the ash into the gas so that it is suspended in the flow of gas and heated by the gas so that the temperature of the fly ash is raised to at least a temperature at which sintering of the fly ash takes place, means for separating hot ash from the gas, means for transforming the ash into frit or means for transforming the ash into pellets of sintered ash, and a regeneration burner system.

10. An apparatus as claimed in claim 9, wherein said introducing means precedes said igniting means in the direction of flow of said gas.

11. An apparatus according to claim 9, in which said separating means comprises a cyclone within which the fly ash is caused to reach its sintering temperature.

12. An apparatus according to claim 11, in which the transforming means comprises a pelletising of chamber or a frit disposed beneath said cyclone.

13. An apparatus according to claim 12, in which the regeneration burner system comprises a pair of pebble beds which are provided with hot valves.

14. A process according to claim 2, in which the sintering temperature is in the range of from 750°C. to 1000° C.

15. An apparatus according to claim 10, in which said separating means comprises a cyclone within which the fly ash is caused to reach its sintering temperature.

* * * * *